Patented Aug. 2, 1949

2,478,151

UNITED STATES PATENT OFFICE 2,478,151

GLASS BATCH COMPOSITION

George J. Bair, Corning, N.Y., assignor to Norbert S. Garbisch, Butler, Pa.

No Drawing. Application December 23, 1943, Serial No. 515,368

6 Claims. (Cl. 106—52)

The present invention relates to the preparation of glass and porcelain enamel batches, and it has particular relation to the preparation of batches including an aluminacious constituent.

An object of the invention is to provide a glass or enamel batch containing an aluminacious material in such form that it will melt down rapidly and will blend uniformly into the molten bath in a glass furnace or pot at a relatively low temperature with a minimum expenditure of fuel.

A second object of the invention is to provide a method of incorporating clay or finely divided aluminacious material into a glass batch without liberation of dust.

A third object is to provide a convenient method of blending clay or other aluminacious material with other batch ingredients.

These and other objects will be apparent from consideration of the following specification and the appended claims.

Alumina is an important constituent in glass and enamel batches. It is added to glass chiefly for its effect of increasing durability. One to four per cent of alumina is added in container glass and may occur in larger amounts in special glasses. Alumina minerals are in general rather slow to dissolve in glass and a small variation in content thereof will generally have marked effect on the viscosity of glass. Even small amounts substantially increase viscosity. This slow melting and high viscosity makes intimate and permanent mixing of the batch essential. Uniformity of mix, however, is difficult to obtain because many aluminacious materials, such as clay, are very fine of grain, which results in batch segregation, when common methods of mixing and batch handling are used.

For these reasons, only the more fusible alumina minerals are used and particle size of these is carefully maintained and selected to minimize segregation. These precautions are expensive and in spite of them considerable quality losses occur, due to inability to get intimate blending of alumina in the batch. Of course, many otherwise satisfactory sources of alumina are excluded.

The most common alumina-bearing ingredients used today are: feldspar, nepheline syenite, aplite, and aluminum hydrate. Other possible materials containing alumina include: clays, slag, diaspore, bauxite, kyanite, sillimanite, prophyllite, and others. This last group of materials is generally avoided because of: (a) impurities, (b) particle size and shape, or (c) refractoriness. For example, clays which contain up to about 40 per cent of alumina are usually avoided because the fine particle size contributes to segregation and because clay tends to cohere and roll up into little balls during handling. Clays are also refractory and if lumps occur, they may not be completely dissolved, or if they do dissolve, the viscous nuclei of high alumina glass formed, resists diffusion into the melt and results in ream, cords, and stria. Clays also commonly contain impurities, such as iron, titanium, lignite, coarse sand, and other undesirable constituents. Mechanical and chemical treatment to remove these impurities are expensive.

The present invention contemplates the employment of alumnacious materials in a relatively fine state of sub-division, and subsequently incorporating the fine material with silica and other insoluble batch ingredients, and finally mixing these constituents while they are moistened or suspended in the alkali metal fluxes in a more or less fluid condition. Then, by drying or otherwise setting the alkali metal fluxes as a more or less continuous phase, the aluminacious particles are bonded with the other batch ingredients in thorough admixture in which there can be no unmixing (segregation or separation of the glass batch ingredients) or liberation of dust, and in which it melts quickly, uniformly and at minimum temperature.

Because of the refractoriness of these alumina-containing materials, fine particle size is essential to intimate blending in the glass melt. Fine particle size also makes effective chemical treatment possible. The material for this process should, therefore, be so pulverized that at least about 95 per cent will pass a screen of 100 mesh and for thorough chemical treatment even finer grinding is beneficial. This grinding can be accomplished either by wet or by dry grinding. Or in the case of naturally fine grained materials like clays, a slurry can be prepared in a blunger. The individual aluminacious ingredients can, if desired, be preliminarily treated by dry or wet magnetic separation to remove magnetic iron or ores. They can also be sieved, lawned, roasted, or subjected to chemical treatment with acids, hydrosulfites, or to other common methods of purification.

The finely divided aluminacious material may be compounded with various types of silicious material in the preparation of a batch. For example, it may be added to batch comprising ordinary batch sand and preferably suitably crushed limestone, dolomite, or other alkali earth metal fluxes, as well as such alkali metal fluxes as soda ash. Mixing must be complete and permanent. This is accomplished by effecting the mixing operations, at least during the latter stages, with the alkali metal fluxes, such as soda ash, salt cake, potassium carbonate, borax, etc., in fluid or partially fluid state. For example, the fluxes may be partially or completely dissolved in water, or they may be rendered fluid by fusion. However, the amount of water, where water is present, should not be so great as to create a sloppy mass. It may be added to a batch which has already been mixed while dry. It is, also, possible to add the aluminacious materials and water, as a slurry or slip.

Often it is desirable to incorporate additional finely divided material other than the aluminacious material to the batch. For example, lime or dolomite ground to pass a screen of 100 mesh or finer may be added. All or a part of the silica may also be so fine as to pass a 100 mesh screen. This fine particle size, of course, increases intimacy of association of the various ingredients and provides a batch which, when the fluxes are hardened, is thoroughly coherent and dustless.

The very finely divided mixture of silica and glass from the grinding and polishing of glass constitute an excellent source of silica and cullet. This material is obtained by using sand approximately of glass batch purity as an abrasive in the surfacing of plate glass and then eliminating runner block iron magnetically and/or chemically. It is of a particle size passing a 325 mesh screen and contains about 15 to 25 per cent of glass. This intimate mixture of silica and glass may replace all or a portion; e. g., 50 per cent of the sand in a glass batch.

If the spent sand from the surfacing of glass is used to supply all or a part of the silica, it may be mixed dry with the aluminacious material and other ingredients, after which the water is added, or the pulverulent clay, feldspar, nepheline syenite, and the like, may be slurried with water and the moist mass incorporated with the other ingredients. However, the spent sand, of necessity, is obtained from the grinding operation as a sludge or slurry. It is normally processed to remove iron; e. g., by the process disclosed in McGregor Patent No. 2,182,384. The aluminacious constituents may be added directly to the spent grinding sand at various stages during the process, giving an intimate blend of these alumina-bearing materials with the major constituent of future glass batches.

The added material, clay or other constituent, may be plunged directly with the waste sand slurry as it enters the McGregor process and purification, that is, magnetic and/or chemical treatment, may be accomplished as the mixture is processed. If the added material is pure or has been previously separately treated and good blending is the only essential function, it may be added to the processed spent grinding sand slurry in an agitator just before filtering. Or it may be mixed in a Muller type mixer with the moist cake after filtering. The moist, intimate mixture resulting from any of these three additions can then be blended with the other ingredients of the batch, or it may be dried before mixing.

In any event, the insoluble ingredients, including the silica, alkali earth metal fluxes and aluminacious material, such as clay, are all thoroughly and uniformly blended in the solution of soluble fluxes so that when the latter have set by crystallization and/or evaporation, chemical action or otherwise, all particles are cemented to provide solid nodules, cakes or other bodies in which there can be no unmixing stratification, or dust liberation. The clay and other ingredients, because of their intimate association, go into solution to form glass rapidly and the resultant melt is highly uniform. Even the clay or other aluminacious body is dissolved rapidly and uniformly. This melting is promoted by the relatively high heat conductivity resulting from the bonding together of all of the particles into coherent masses.

The compounded batch preferably will contain about 15 to 25 per cent of moisture. While moist, it may be molded or otherwise formed into masses of suitable size and shape for feeding into a pot or tank. The batch can, also, be formed into nodules or briquettes by the process disclosed in the Bair and Miller Patent No. 2,220,750. Setting of the soluble fluxes of the batch can be promoted by heating in kilns or the like; normal crystallization and evaporation at atmospheric temperature can also be relied upon.

The final composition of the blended mixture can be varied as needed. One spent grinding sand-clay mixture which has been found satisfactory when used for making a container batch is as follows:

| | Pounds |
|---|---|
| Spent grinding sand-clay mix (90:10 mix) | 1000 |
| Dolomite | 166 |
| Soda ash | 282 |
| Salt cake | 11 |

The water content of this batch may be approximately 17 to 25 per cent based upon the content of spent sand and clay. Glass from this batch contained 2.5 per cent alumina.

I claim:

1. A glass batch composition comprising approximately 900 parts by weight of silica, 166 parts by weight of alkali earth metal carbonate which is a flux, 100 parts by weight of finely divided clay and 293 parts by weight of alkali metal flux, a compound of a class consisting of sodium and potassium carbonates, salt cake and borax all intimately but mechanically mixed, the alkali metal flux being dissolved in 15 to 25% of water upon the basis of compounded batch whereby to form a moist mass which when dried will form a coherent, dustless body in which the alkali metal compound constitutes a cement between the particles of silica, alkali earth metal carbonate and clay, the body being adapted uniformly to fuse down to form glass.

2. A composition as defined in claim 1 in which the silica is of such particle size as to pass through a screen of 325 mesh.

3. A glass batch composition embodying silica, alkali earth metal carbonate which is a flux and finely divided clay all intimately and uniformly mechanically intermixed and further being cemented into a hard, coherent, dustless body by means of a matrix of crystalline alkali metal carbonate which is a flux, the components of the body being adapted to be fused down to form homogeneous glass, the silica and the clay being in a ratio of 9 parts to 1 part with respect to each other.

4. A glass batch composition comprising silica, alkali earth metal carbonate, finely divided clay and alkali metal carbonate all intimately but mechanically mixed, the alkali metal carbonate being dissolved in 15 to 25% of water upon the basis of compounded batch whereby to form a moist mass which when dried will form a coherent, hard, dustless body in which the alkali metal carbonate constitutes a matrix that cements between the particles of silica, alkali earth metal carbonate and clay, the body being adapted uniformly to fuse down to form glass, the ratio of silica to clay being in a proportion of 9 parts to 1 part.

5. A glass batch composition embodying silica, alkali earth metal carbonate constituting a flux and finely divided clay all intimately and uniformly mechanically intermixed and being fusible to form glass, the three further being cemented into a hard, coherent, dustless body by means of a matrix of crystalline alkali metal compound of a class consisting of carbonates of sodium and potassium, salt cake and borax, the components of the body being adapted to be fused down to form homogeneous glass.

6. A composition as defined in claim 5 in which the silica is of such particle size as to pass through a screen of 325 mesh.

GEORGE J. BAIR.

REFERENCES CITED

The following references are of record in the file of this patent:

UNITED STATES PATENTS

| Number | Name | Date |
|---|---|---|
| 2,084,328 | Eells et al. | June 22, 1937 |
| 2,220,750 | Bair et al. | Nov. 5, 1940 |
| 2,245,473 | Garbisch | June 10, 1941 |
| 2,313,566 | McGregor | Mar. 9, 1943 |
| 2,366,473 | Bair | Jan. 2, 1945 |

FOREIGN PATENTS

| Number | Country | Date |
|---|---|---|
| 2,921 | Great Britain | 1899 |
| 472,027 | Great Britain | 1937 |